United States Patent
Karimli et al.

(10) Patent No.: US 10,462,794 B2
(45) Date of Patent: Oct. 29, 2019

(54) DEFERENTIAL CHANNEL SELECTION OF CHANNELS IN UNLICENSED SPECTRUM

(71) Applicant: T-Mobile USA, Inc., Bellevue, WA (US)

(72) Inventors: Yasmin Karimli, Kirkland, WA (US); Gunjan Nimbavikar, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/812,520

(22) Filed: Jul. 29, 2015

(65) Prior Publication Data

US 2017/0034832 A1   Feb. 2, 2017

(51) Int. Cl.
*H04W 72/08* (2009.01)
*H04W 36/00* (2009.01)
*H04W 16/14* (2009.01)
*H04W 88/08* (2009.01)

(52) U.S. Cl.
CPC ......... *H04W 72/082* (2013.01); *H04W 16/14* (2013.01); *H04W 36/0083* (2013.01); *H04W 88/08* (2013.01)

(58) Field of Classification Search
CPC ........... H04W 72/082; H04W 36/0083; H04W 72/08; H04W 36/00
USPC ................ 455/434, 435.1–435.3; 370/329
See application file for complete search history.

(56) References Cited

U.S. PATENT DOCUMENTS

| | | | |
|---|---|---|---|
| 7,286,515 B2 | 10/2007 | Olson et al. | |
| 9,276,807 B2 | 3/2016 | Nasir et al. | |
| 9,351,282 B2 | 5/2016 | Freda et al. | |
| 9,900,865 B2 | 2/2018 | Seok | |
| 2003/0185163 A1* | 10/2003 | Bertonis | H04B 1/707 370/315 |
| 2006/0178145 A1 | 8/2006 | Floam et al. | |
| 2007/0025310 A1 | 2/2007 | Weng et al. | |
| 2007/0149230 A1 | 6/2007 | Song et al. | |
| 2009/0137247 A1 | 5/2009 | Mok | |
| 2012/0039284 A1 | 2/2012 | Barbieri et al. | |
| 2012/0044888 A1 | 2/2012 | Adling et al. | |
| 2012/0094681 A1* | 4/2012 | Freda | H04W 72/02 455/452.1 |

(Continued)

OTHER PUBLICATIONS

The PCT Search Report and Written Opinion dated Oct. 21, 2016 for PCT application No. PCT/US2016/042599, 15 pages.

(Continued)

*Primary Examiner* — Charles N Appiah
*Assistant Examiner* — Nicole Louis-Fils
(74) *Attorney, Agent, or Firm* — Lee & Hayes, P.C.

(57) ABSTRACT

In some implementations, an access point may receive a request to select an operating channel for a computing device. The access point may determine that a network service provider is associated with the computing device. The access point may determine that at least one neighboring access point is associated with the network service provider. The access point may determine a channel in an unlicensed spectrum that is used by the at least one neighboring access point. The access point may perform a scan of the unlicensed spectrum that excludes the channel used by the at least one neighboring access point and select the operating channel based at least partly on the scan.

20 Claims, 6 Drawing Sheets

(56) References Cited

U.S. PATENT DOCUMENTS

| | | |
|---|---|---|
| 2012/0163309 A1* | 6/2012 | Ma .................. H04B 7/2606 370/329 |
| 2013/0039315 A1 | 2/2013 | Jo et al. |
| 2013/0155991 A1 | 6/2013 | Kazmi et al. |
| 2013/0196632 A1 | 8/2013 | Horn et al. |
| 2014/0044077 A1 | 2/2014 | Chen et al. |
| 2014/0044105 A1 | 2/2014 | Bontu et al. |
| 2014/0087727 A1* | 3/2014 | Walton .................. H04W 48/16 455/434 |
| 2014/0105134 A1 | 4/2014 | Buddhikot et al. |
| 2014/0297822 A1 | 10/2014 | Agrawal et al. |
| 2014/0329527 A1 | 11/2014 | Choi-Grogan et al. |
| 2015/0009962 A1 | 1/2015 | Clegg |
| 2015/0063323 A1* | 3/2015 | Sadek ................ H04W 72/1215 370/336 |
| 2015/0156635 A1 | 6/2015 | Liang et al. |
| 2015/0156636 A1 | 6/2015 | Tabet et al. |
| 2015/0223244 A1 | 8/2015 | Tabet et al. |
| 2015/0296516 A1 | 10/2015 | Jung |
| 2015/0373587 A1 | 12/2015 | Josiam et al. |
| 2016/0007273 A1* | 1/2016 | Farid .................. H04W 48/16 370/329 |
| 2016/0007350 A1 | 1/2016 | Xiong et al. |
| 2016/0066204 A1 | 3/2016 | Khawer et al. |
| 2016/0165604 A1 | 6/2016 | Khawer et al. |
| 2016/0227416 A1* | 8/2016 | Suzuki .............. H04W 72/0453 |
| 2016/0249255 A1 | 8/2016 | Khawer et al. |
| 2016/0301504 A1 | 10/2016 | Toskala et al. |
| 2016/0381645 A1* | 12/2016 | Shanks ................ H04W 24/10 370/338 |
| 2017/0064619 A1 | 3/2017 | Neelisetty et al. |
| 2017/0070935 A1 | 3/2017 | Karimli et al. |
| 2017/0188284 A1 | 6/2017 | Karimli et al. |
| 2017/0373914 A1* | 12/2017 | Harada .................. H04J 1/00 |

OTHER PUBLICATIONS

The PCT Search Report and Written Opinion dated Nov. 17, 2016 for PCT application No. PCT/US2016/047040, 14 pages.

Office action for U.S. Appl. No. 14/844,856, dated Jun. 15, 2016, Karimli et al., "Selecting a Channel Based on Backhaul Bandwidth", 6 pages.

Office Action for U.S. Appl. No. 15/459,751, dated Jun. 14, 2017, Yasmin Karimli, "Selecting a Channel Based on Backhaul Bandwidth", 7 pages.

Office Action for U.S. Appl. No. 15/459,751, dated Jan. 22, 2018, Yasmin Karimli, "Selecting a Channel Based on Backhaul Bandwidth", 7 pages.

Office Action for U.S. Appl. No. 15/459,751, dated Jul. 16, 2018, Yasmin Karimli, "Selecting a Channel Based on Backhaul Bandwidth", 10 pages.

* cited by examiner

DEFERENTIAL CHANNEL SELECTION OF CHANNELS IN UNLICENSED SPECTRUM

BACKGROUND

In a country in which a wireless carrier offers network services, the wireless carrier may operate using spectrum licensed from the country's government. However, as data traffic from mobile devices (e.g., cell phones, tablets, laptops, etc.) has increased, some governments have made unlicensed spectrum available to carriers. Unlicensed spectrum may include spectrum that carriers can use for free, e.g., without having to pay the government (or any other entity).

For example, in the United States of America (U.S.A.), the Federal Communications Commission (FCC) has made the Unlicensed National Information Infrastructure (UNII) spectrum in the 5 Gigahertz (GHz) range, e.g., frequency bands in the range between approximately 5.15 GHz to approximately 5.825 GHz, available to wireless carriers. However portions of this spectrum may be used for other purposes, such as wireless local area networks (WLAN), using technologies such as Institute of Electrical and Electronics Engineers (IEEE) 802.11x (where x=a, b, g, n, or the like).

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

The systems and techniques described herein may be used by nodes (e.g., access points) of a network service provider to deferentially scan spectrum when selecting an operating channel. For example, a network of a service provider may include licensed spectrum (e.g., cellular spectrum) and unlicensed spectrum. The service provider's network may include nodes that use IEEE 802.11x. In addition, the service provider may deploy nodes that use UNII-1 and UNII-3 spectrum for Long Term Evolution-Unlicensed (LTE-U) access, also known as License Assisted Access (LAA). The nodes providing LTE-U/LAA access may deferentially scan spectrum when selecting an operating channel by excluding channels of neighboring nodes that are associated with the service provider when selecting an operating channel. In the deferential scan, a particular node associated with the service provider may identify operating channels of neighboring nodes that are associated with the service provider and exclude the identified operating channels when performing the deferential scan. A neighboring node may be a node with an operating channel whose broadcast overlaps the broadcast of an operating channel of the particular node. For example, when a signal strength, as measured by a first node, of a broadcast of a second node satisfies a threshold, then the second node is determined to be a neighboring node to the first node. To illustrate, if a first node determines that a signal strength (e.g., as measured by the first node) of a signal broadcast by a second node is at least 75 decibel milliwatts (dbm), then the second node may be considered to neighbor the first node. An LTE-U/LAA access node may identify neighboring nodes (e.g., nodes broadcasting in an area that overlaps with an area in which the LTE-U/LAA access node is broadcasting). The LTE-U/LAA access node may determine which of the neighboring nodes are associated with the same service provider that is associated with the LTE-U/LAA access node and exclude the operating channels of those neighboring nodes when scanning to identify an operating channel for a computing device (e.g., a wireless phone, a tablet, a notebook computer, or other type of computing device). By providing deferential treatment, the operating channel that is selected may operate at a different frequency than the channels (e.g., operating channels) of the neighboring nodes that are associated with the service provider of the LTE-U/LAA access node.

To illustrate, an access point may receive a request to select an operating channel for a computing device. The access point may determine a network service provider associated with the access point (or with the computing device). The access point may determine that at least one neighboring access point is associated with the network service provider. The access point may determine an operating channel in an unlicensed spectrum of the at least one neighboring access point. The access point may perform a scan of the unlicensed spectrum that excludes the operating channel of the at least one neighboring access point and select the operating channel based at least partly on the scan.

Figure 1:
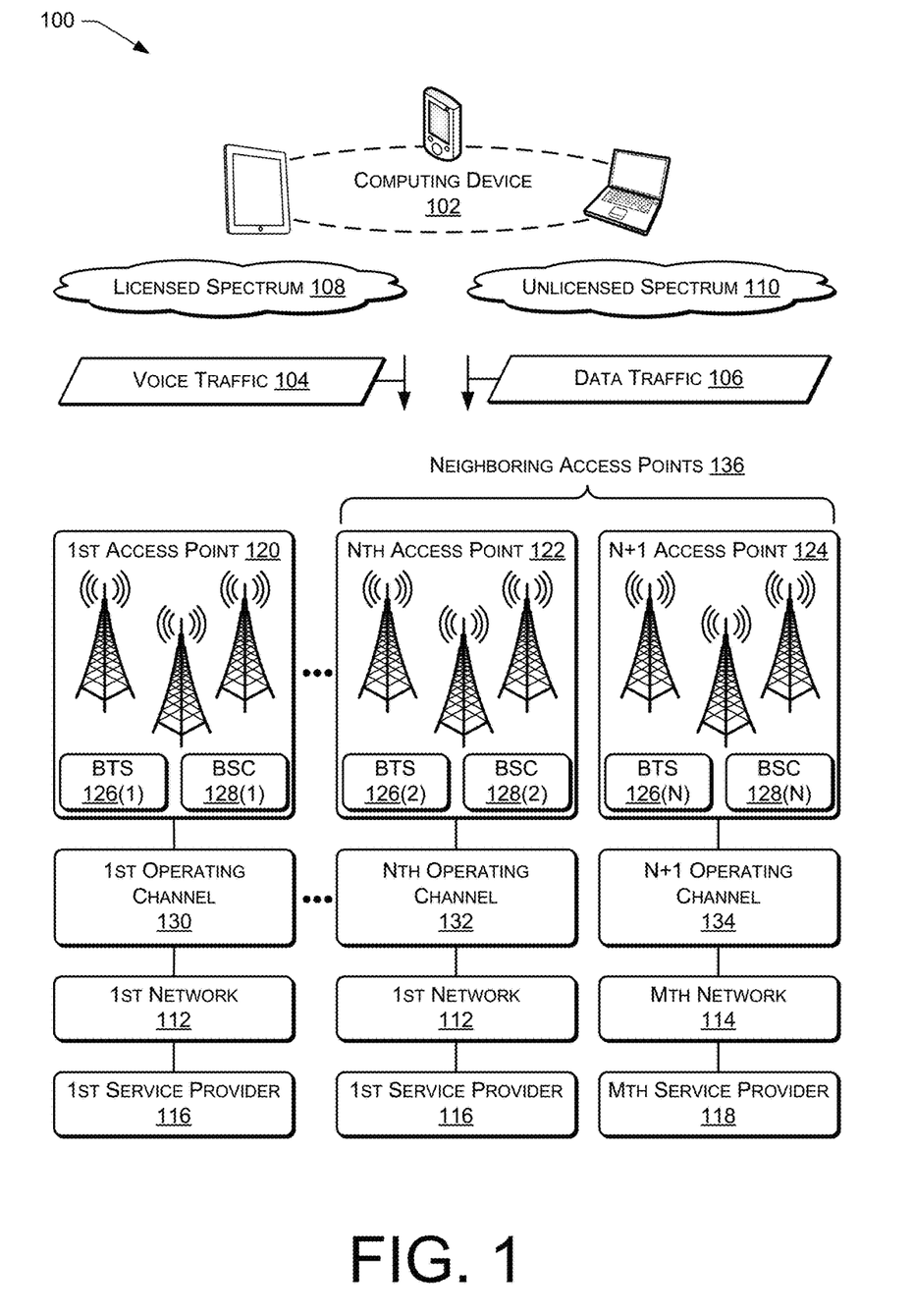
FIG. 1 is a block diagram illustrating a system that includes communications traffic over licensed and unlicensed spectrum according to some implementations.

FIG. 1 is a block diagram illustrating a system 100 that includes communications traffic over licensed and unlicensed spectrum according to some implementations. The system 100 includes one or more computing devices, such as a representative computing device 102.

The computing device 102 may comprise a wireless phone, a tablet computer, a laptop computer, a wristwatch, a gaming device, or other type of computing device. The computing device 102 may include one or more processors and computer readable media, such as memory (e.g., random access memory (RAM), solid state drives (SSDs), or the like), disk drives (e.g., platter-based hard drives), another type of computer-readable media, or any combination thereof.

The computing device 102 may generate voice traffic 104, data traffic 106, or both. The traffic 104, 106 may be carried across a licensed spectrum 108, an unlicensed spectrum 110, or both (e.g., via channel aggregation in which two or more channels are used to carry a particular stream of traffic). For example, in the United States, the unlicensed spectrum 110 may include the Unlicensed National Information Infrastructure (UNII) spectrum. The licensed spectrum 108 may include spectrum that has been licensed for a fee from a government agency (e.g., the Federal Communications Commission (FCC)). The unlicensed spectrum 110 may include spectrum that is made available for free for specific types of uses (e.g., Industrial, Medical, Scientific, etc.). In some cases, a government agency (e.g., the FCC) may make the unlicensed spectrum available to cellular carriers. Channel aggregation (also known as link aggregation) may use multiple channels in parallel to increase throughput beyond what a single channel can carry, and to provide redundancy in case one of the channels should encounter problems.

The frequencies of the licensed spectrum 108 may be located in the ultra-high frequency (UHF) bands and may vary based on (i) a country in which the communication is taking place and (ii) a carrier's operating frequencies in the country. For example, in the United States, the licensed spectrum 108 may include 800 megahertz (MHz), 850 MHz, 1700 MHz, 1900 MHz, 2100 MHz, other UHF frequencies, or any combination thereof. The unlicensed spectrum 110 may include UNII-1 (e.g., 5.15-5.25 gigahertz (GHz)), UNII-2 (e.g., 5.25-5.35 GHz), UNII-2e (e.g., 5.47-5.725 GHz), and UNII-3 (e.g., 5.725 to 5.825 GHz). Portions of the unlicensed spectrum 110 may be used for wireless local area network (WLAN) traffic, such as WLAN traffic that conforms to the Institute of Electrical and Electronics Engineers (IEEE) 802.11x specifications (e.g., where x=a, b, g, n, etc.). While systems and techniques are described herein with reference to spectrum in the United States, the systems and techniques may also be applied to licensed spectrum and unlicensed spectrum in other countries.

The traffic 104, 106 may be communicated (e.g., transmitted and received) between the computing device 102 and a particular network. For example, more than one network may be available. As illustrated in FIG. 1, M (where M>1) networks, from a first network 112 to an Mth network 114 may be available. Each of the networks 112 to 114 may be associated with a corresponding service provider. For example, the first network 112 may be associated with a first service provider 116 and the Mth network 114 may be associated with an Mth service provider 118. In the United States, the services providers 116 to 118 may include Sprint™, Verizon™, AT&T™, and T-Mobile™.

Each of the networks 112 to 114 may be accessed via multiple access points located in multiple locations. For example, the first network 112 may include a first access point 120 to an Nth access point 122 (where N>1, N not necessarily equal to M). The Mth network 114 may include multiple access points, such as a representative N+1 access point 124. Each of the access points 120 to 122, 124 may include a base transceiver station (BTS) 126 and a base station controller (BSC) 128 to provide network coverage within a particular area. For example, the first access point 120 may include a BTS 126(1) and a BSC 128(1), the Nth access point 122 may include a BTS 126(2) and a BSC 128(2), and the N+1 access point 122 may include a BTS 126(3) and a BSC 128(3). The BTS 126 may facilitate wireless communication between user equipment (e.g., the computing device 102) and a network (e.g., one of the networks 112 to 114). The BSC 128 may be used to control the functions of the BTS 126. The BSC 126 may control multiple BTSs, such as the representative BTS 126. The BSC 126 may handle allocation of radio channels, receive measurements from mobile devices, and control handovers from one BTS to another BTS. In some cases, the BSC 126 may act as a concentrator where many different low capacity connections to BTSs (with relatively low utilization) become reduced to a smaller number of connections towards a mobile switching center (MSC) (with a high level of utilization).

Each of the access points 120 to 122, 124 may operate at a particular operating channel in the licensed spectrum 108 or in the unlicensed spectrum 110. For example, the first access point 120 may transmit and receive traffic (e.g., the voice traffic 104, the data traffic 106, or both) using a first operating channel 130, the Nth access point 122 may transmit and receive using an Nth operating channel 132, and the N+1 access point 124 may transmit and receive using an N+1 operating channel 134.

The access points 120 to 122, 124 may comprise low-powered cells that operate in licensed spectrum (e.g., the licensed spectrum 108) and unlicensed spectrum (e.g., the unlicensed spectrum 110). The access points 120 to 122, 124 may have a range of 10 meters to 2 kilometers or more, depending on the configuration. In some cases, depending on factors such as the physical size, the coverage area, and the configuration, the access points 120 to 122, 124 may be referred to as small cells (e.g., femtocells, picocells, microcells, or the like).

The computing device 102 may be associated with a particular network service provider. For example, the computing device 102 may be associated with the first service provider 116. When the computing device 102 is powered up, the computing device 102 may search for and identify a nearest access point, such as the first access point 120 that is associated with the first service provider 116.

The first access point 120 may scan spectrum (e.g., the spectrum 108, the spectrum 110, or both) to identify an operating channel to provide to the computing device 102. The first access point 120 may use a deferential scanning technique to scan the spectrum. For example, the first access point 120 may identify one or more neighboring access points, such as neighboring access points 136. The access points 122, 124 may be determined to be the neighboring access points 136 to the first access point 120 because a signal strength of the operating channels 132, 134, as measured by the first access point 120, may satisfy a predetermined threshold. For example, the access points 122, 124 may be determined to be the neighboring access points 136 because the signal strength of the operating channels 132, 134, as measured by the first access point 120, may be −75 dbm or greater. The first access point 120 may determine whether any of the neighboring access points 116 are associated with the first service provider 116. For example, the first access point 120 may determine that the Nth access point 122 of the neighboring access points 136 is associated with the first service provider 116. The first access point 120 may determine that the neighboring access points 136 are associated with a particular service provider based on an identifier (e.g., service set identifier (SSID) or other identifier) being broadcast by the neighboring access points 136 that uniquely identifies the particular service provider. If one or more of the neighboring access points 136 are associated with the first service provider 116, the first access point 120 may determine the operating channel(s) of the neighboring access points 136 that are associated with the first service provider 116. In the example illustrated in FIG. 1, the first access point 120 may determine that the Nth access point 122 (e.g., associated with the first network 112) is using the Nth operating channel 132. When scanning the spectrum to identify the first operating channel for the computing device 102, the first access point 120 may exclude Nth operating channel 132 because the Nth operating channel 132 is being used by the Nth access point 122 associated with the first service provider 116.

Thus, an access point associated with a particular service provider may perform a deferential scan (e.g., a scan that is deferential to channels used by access points of the particular service provider) by excluding channels of neighboring nodes that are associated with the particular service provider. The access point may identify neighboring nodes associated with the particular service provider based on an identifier (e.g., service set identifier (SSID) or other identifier) being broadcast by the neighboring nodes that uniquely identifies the particular service provider. For example, in FIG. 1, the first access point 120 may exclude the Nth operating channel 132 of the Nth access point 122 when performing a scan to identify the first operating channel 130 because the Nth operating channel 132 is being used by the Nth access point 122 that is associated with the first service provider 116. Thus, the first operating channel 130 may be different from the Nth operating channel 132. In some cases, the first operating channel 130 may be the same as the N+1 operating channel 134 because the N+1 operating channel 134 is used by the N+1 access point 124 associated with the Mth service provider 118.

The techniques and systems described herein may be used when a service provider with a cellular network and a WLAN network (e.g., using 802.11x) deploys access points that make use of the unlicensed spectrum 110 (e.g., UNII-1 and UNII-3). An access point associated with the service provider may identify neighboring access points that are part of the service provider's WLAN. The access point may perform deferential scanning by excluding the operating channels (e.g., in the unlicensed spectrum) being used by neighboring access points that are part of the service provider's WLAN when scanning.

Figure 2:
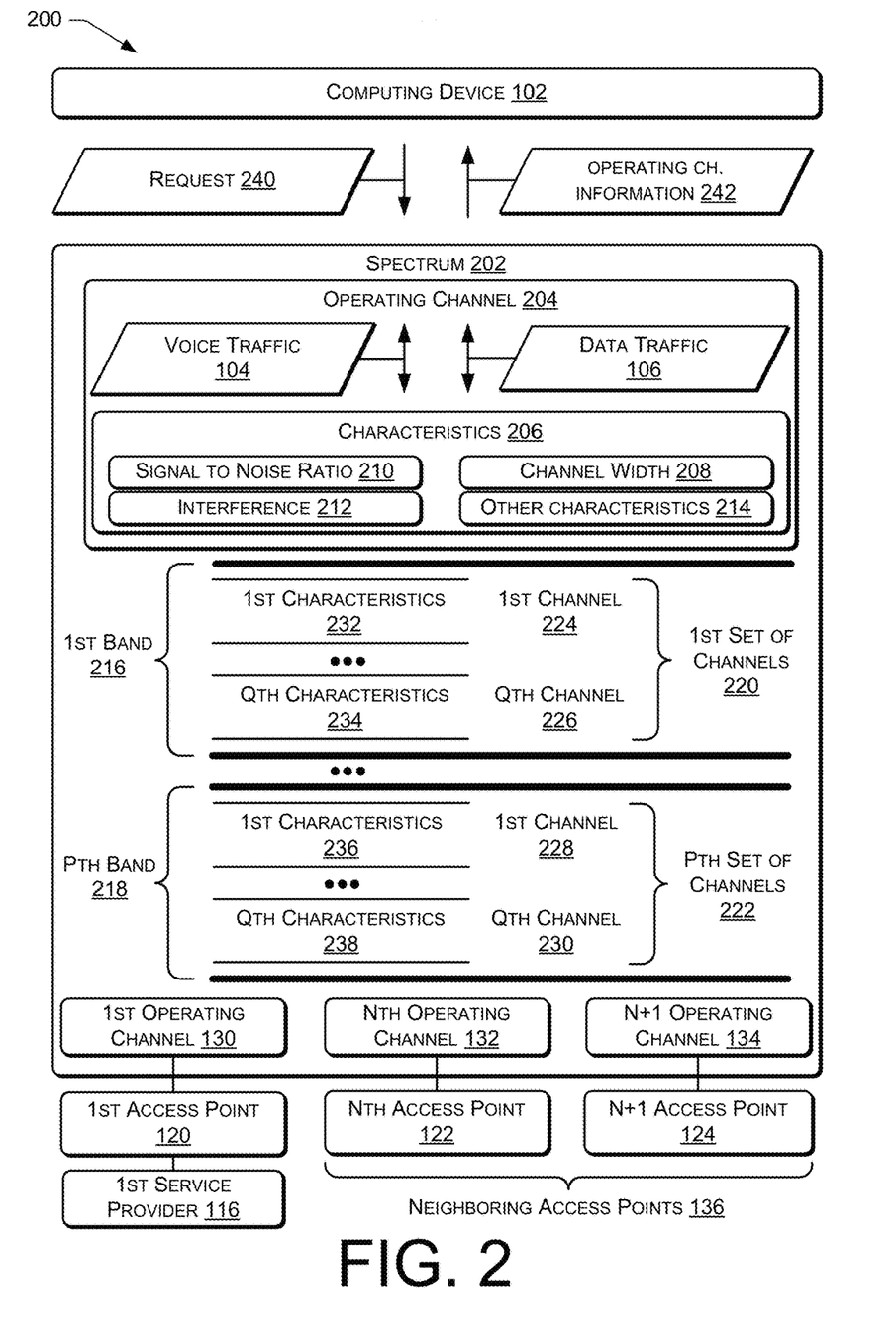
FIG. 2 is a block diagram illustrating a system that includes an operating channel according to some implementations.

FIG. 2 is a block diagram illustrating a system 200 that includes an operating channel according to some implementations. A spectrum 202 may include an unlicensed spectrum (e.g., the unlicensed spectrum 110 of FIG. 1), a licensed spectrum (e.g., the licensed spectrum 108), or both. The access point 120 may select an operating channel 204 in the spectrum 202 for each device (e.g., the computing device 102) that requests to communicate via a network (e.g., one of the networks 112, 114). The operating channel 204 may carry the voice traffic 104 (e.g., voice over internet protocol (VoIP) traffic), the data traffic 106, or both. Certain types of traffic, such as the voice traffic 104, that specify a particular level of service (e.g., low latency), may be carried primarily over the licensed spectrum 108, while other types of traffic (e.g., the data traffic 110) that do not specify a particular level of service (or the level of service that is specified is satisfied by the unlicensed spectrum), may be carried primarily over the unlicensed spectrum 108.

The operating channel 204 may have one or more characteristics 206. For example, the characteristics 206 may include a channel width 208, a signal to noise ratio (SNR) 210, an amount of interference 212, and other characteristics 214. The channel width 208 may identify an amount of traffic (e.g., bits) that can be transferred in each transfer operation. Thus, a data transfer rate of the operating channel 204 may be determined by multiplying the channel width 208 (e.g., bits/transfer) with a transfer rate (e.g., transfers/second) to determine the number of bits transferred per second. The SNR 210 is a ratio of an amount of a signal (e.g., relevant data) relative to an amount of noise (e.g., irrelevant data) in the operating channel 204. The interference 212 indicates an amount of disruption caused by signals in other channels to the operating channel 204, such as crosstalk, in which signals from channels adjacent to or near the operating channel 204 impinge (e.g., leak) into the operating channel 204. The other characteristics 214 may include characteristics associated with the operating channel 204, such as a data transfer rate of the operating channel 204, etc.

The operating channel 204 may be selected from multiple channels in the spectrum 202 based on one or more of the characteristics 206. For example, the operating channel 204 may be selected based on the channel width 208, the SNR 210, the interference 212, the other characteristics 214, or any combination thereof.

The spectrum 202 may include multiple frequency bands, such as a first band 216 to a Pth band 218 (where P>1). Each of the bands 216 to 218 may include a set of channels. For example, the first band 216 may include a first set of channels 220 and the Pth band 218 may include a Pth set of channels 222. Each of the set of channels 220, 222 may include one or more channels. For example, the first set of channels 220 may include a first channel 224 to a Qth channel 226 (where Q>1, Q not necessarily equal to P). The Pth set of channels 222 may include a first channel 228 to a Qth channel 230.

Each of the channels 224 to 226 and 228 to 230 may have corresponding characteristics. For example, in the first band 216, the first channel 224 may have corresponding first characteristics 232 and the Qth channel 226 may have corresponding characteristics 234. In the Pth band 218, the first channel 228 may have corresponding characteristics 236 and the Qth channel 230 may have corresponding characteristics 238.

The access point 120 may receive a request 240 from the computing device 102 to identify an operating channel. The access point 120 may determine which of the neighboring access points 136 are associated with the first service provider 116. The access point 120 may perform a deferential scan of the spectrum 202 by excluding from the scan operating channels of the neighboring access points 136 that are associated with the first service provider 116. During the deferential scan, the access point 120 may determine one or more of the characteristics 206 for each of the channels being scanned. The access point 120 may select the operating channel 204 based on one or more of the characteristics 206. For example, the access point 120 may scan the first set of channels 220, excluding operating channels of the neighboring access points 136 that are associated with the first service provider 116, to determine the characteristics 232 to 234. The access point 120 may scan the Pth set of channels 220, excluding operating channels of the neighboring access points 136 that are associated with the first service provider 116, to determine the characteristics 236 to 238. The access point 120 may select the operating channel 204 based on one of the characteristics 206, such as the signal to noise ratio 210. The cell 114 may provide operating channel information 242 to the computing device 102 to enable the computing device 102 to use the operating channel 204.

Thus, an access point may receive a request from a computing device to select an operating channel. The access point may determine whether any neighboring access points are associated with a particular service provider (e.g., the service provider associated with the computing device or associated with the access point) and perform a deferential scan that excludes operating channels used by neighboring access points that are associated with the particular service provider. The channels that are scanned may be in unlicensed spectrum, in licensed spectrum, or in both. During the deferential scan, the access point may determine one or more characteristics (e.g., channel width, signal to noise ratio, an amount of interference, or the like) of each channel. The access point may select the operating channel based on at least one of the one or more characteristics. After selecting the operating channel, the cell may continue to monitor characteristics of the operating channel. If one or more conditions are satisfied, the cell may re-scan and select a new (e.g., different) operating frequency. For example, the cell may re-scan after a predetermined period of time has elapsed. As another example, the cell may re-scan if the signal to noise ratio falls below a predetermined threshold. As yet another example, the cell may re-scan if the interference increases above a predetermined threshold. In some cases, the re-scan may including re-determining the operating channels of neighboring access points that are associated with the particular service provider and re-scanning the spectrum using a deferential scanning scheme.

Figure 3:
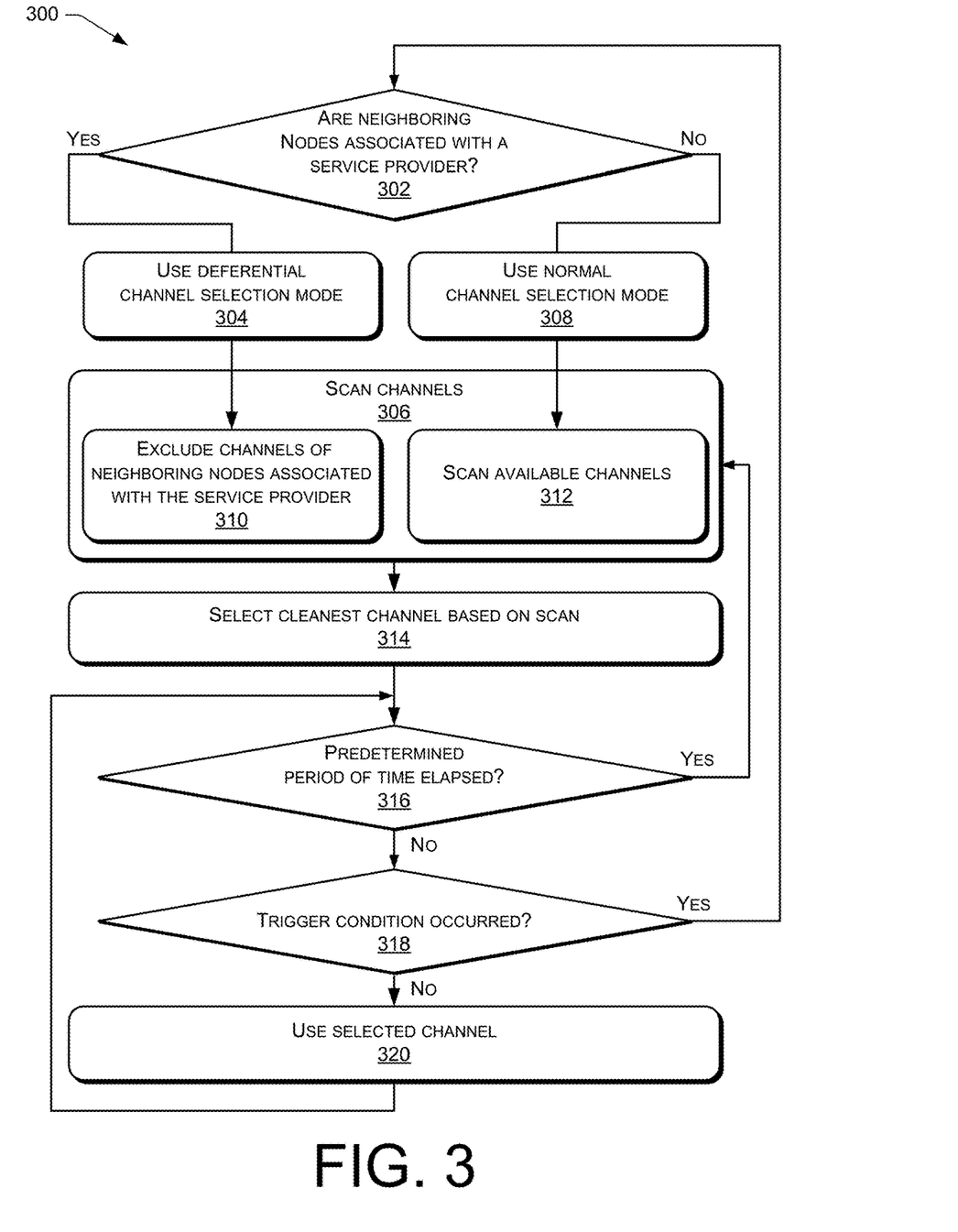
FIG. 3 is a flow diagram of an example process that includes a deferential channel selection mode according to some implementations.
Figure 4:
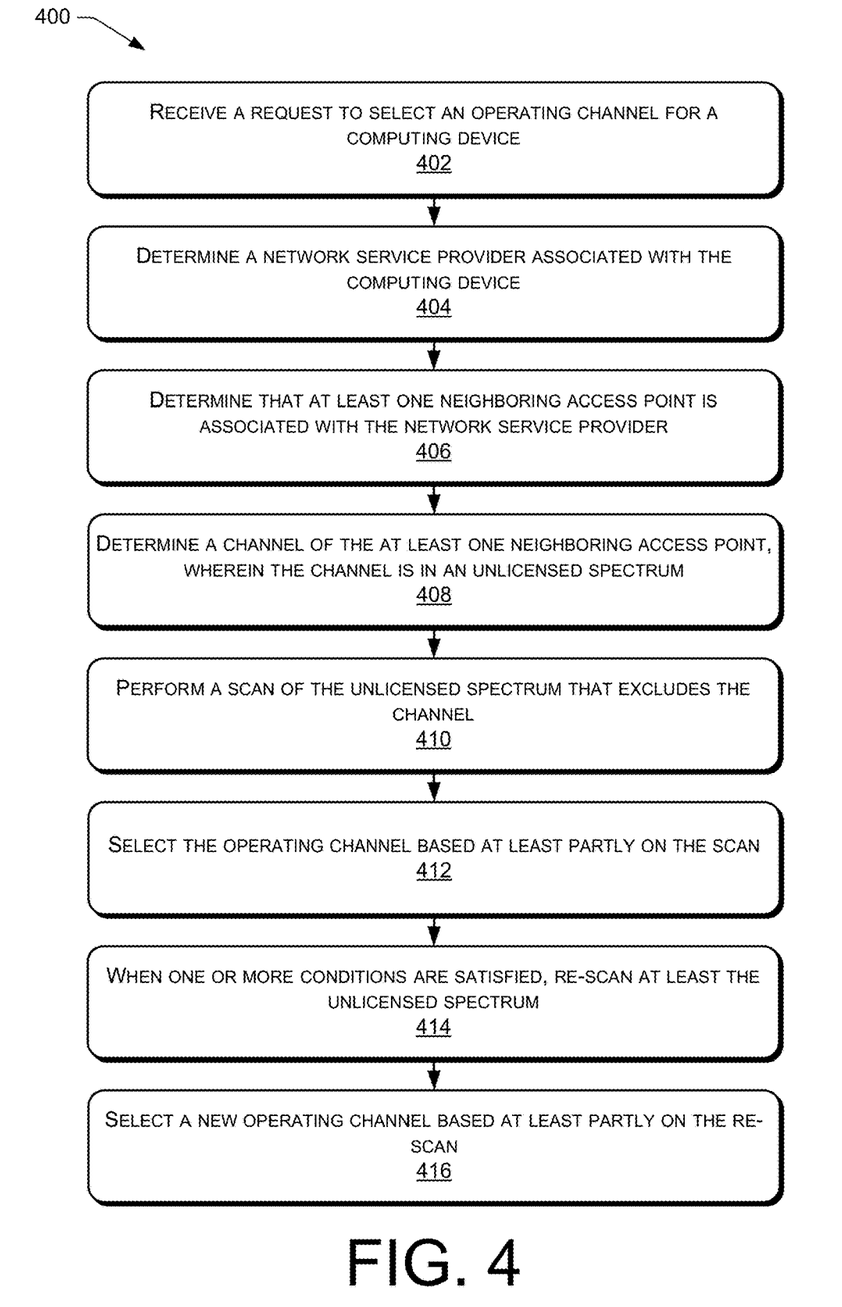
FIG. 4 is a flow diagram of an example process that includes scanning an unlicensed spectrum according to some implementations.
Figure 5:
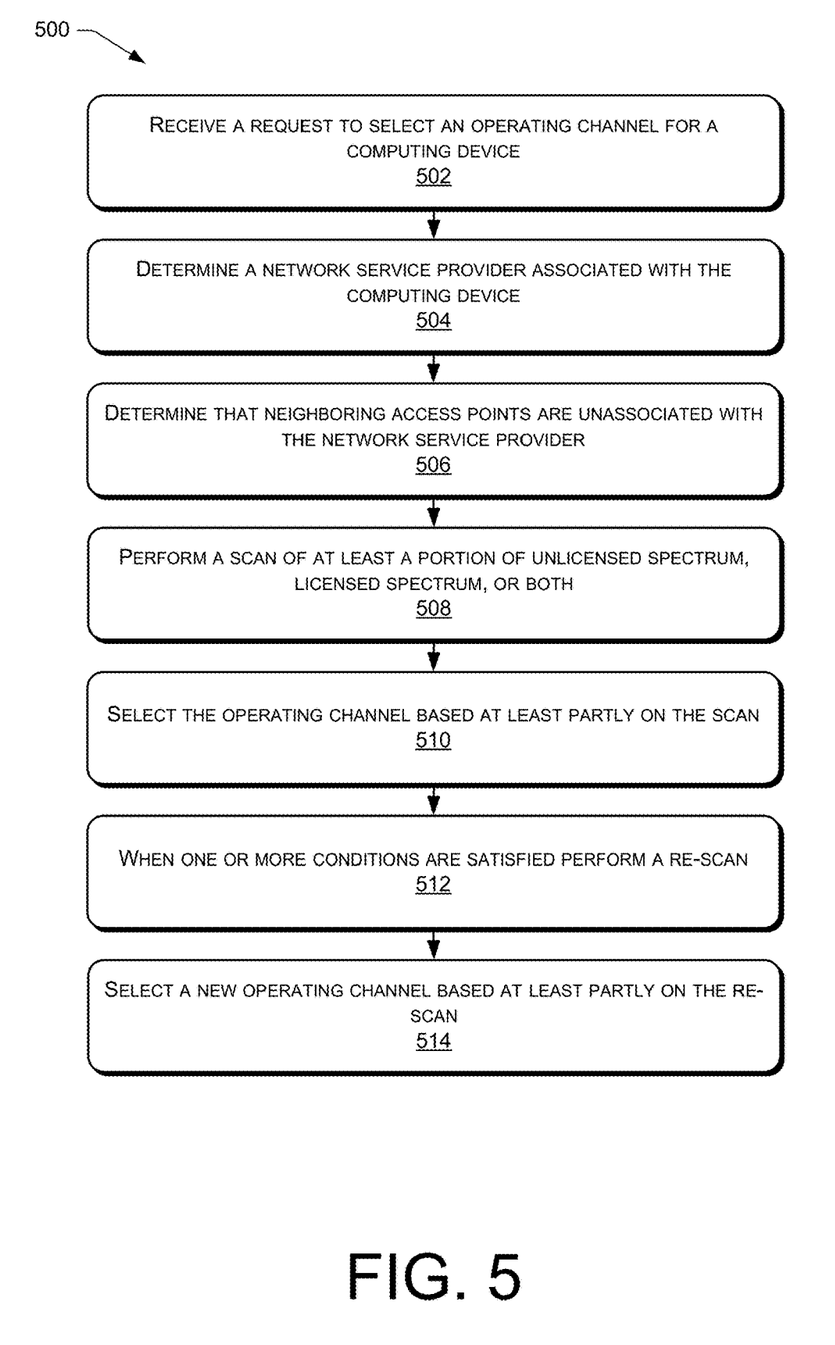
FIG. 5 is a flow diagram of an example process that includes scanning a licensed spectrum and an unlicensed spectrum according to some implementations.

In the flow diagrams of FIGS. 3, 4, and 5, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 300, 400, and 500 are described with reference to FIGS. 1 and 2 as described above, although other models, frameworks, systems and environments may implement these processes.

FIG. 3 is a flow diagram of an example process 300 that includes a deferential channel selection mode according to some implementations. The process 300 may be performed by an access point, such as the access point 120, the access point 122, or the access point 124 of FIG. 1.

At 302, a determination is made whether neighboring nodes are associated with a particular service provider. If a determination is made, at 302, that (e.g., "yes") one or more neighboring nodes are associated with the particular service provider, then a deferential channel selection mode is used, at 304 when scanning channels, at 306. If a determination is made, at 302, that (e.g., "no") none of the neighboring nodes are associated with the particular service provider, then a normal channel selection mode is used, at 308 when scanning channels, at 306. For example, in FIG. 1, the first access point 120 may determine which of the neighboring access points 136 are associated with the first service provider 116. To illustrate, the first access point 120 may determine that the Nth access point 122 is associated with the first service provider 116 and that the N+1 access point 124 is associated with the Mth service provider 118 (e.g., the N+1 access point 124 is unassociated with the 1st service provider 116). Based on determining that the Nth access point 122 is associated with the first service provider 116, the first access point 120 may select the deferential channel selection mode. If the first access point 120 determines that none of the neighboring access points 136 are associated with the first service provider 116, the first access point 120 may select the normal channel selection mode.

At 306, the access point may scan channels (e.g., available channels, also known as unoccupied channels) in a spectrum. The spectrum may include a licensed spectrum, an unlicensed spectrum, or both. If the deferential channel selection mode is selected, at 304, then channels of neighboring nodes that are associated with the particular service provider are excluded during the scan, at 310. If the normal channel selection mode is selected, at 308, then available channels are scanned, at 312. In either the deferential channel selection mode or in the normal channel selection mode, the scan may include determining one or more characteristics of channels that are scanned. At 314, a cleanest channel (e.g., a channel with an SNR greater than a first threshold or a channel with interference less than a second threshold) may be selected based on the scan. For example, in FIG. 1, based on determining that the Nth access point 122 is associated with the first service provider 116, the first access point 120 may select the deferential channel selection mode and scan one or more of the spectrums 108, 110 while excluding the Nth operating channel 132. If the first access point 120 determines that none of the neighboring access points 136 are associated with the first service provider 116, the first access point 120 may select the normal channel selection mode and scan available channels in one or more of the spectrums 108, 110 while excluding the Nth operating channel 132. During the scan, the first access point 120 may determine a channel that has a characteristic (e.g., SNR, interference, etc.) that satisfies a threshold and select the channel as the first operating channel 130.

At 316, a determination is made whether a predetermined period of time has elapsed. If a determination is made, at 316, that (e.g., "yes") a predetermined period of time has elapsed, then the process proceeds to 306 and the channels in the spectrum scanned. The scan at 306 may be performed in the deferential channel selection mode or the normal channel selection mode depending on the previously selected channel selection mode. For example, if the deferential channel selection mode was previously selected then a scan is performed that excludes channels of neighboring nodes associated with the service provider. If the normal channel selection mode was previously selected then a scan of available channels in the spectrum is performed.

If a determination is made, at 316, that (e.g., "no") a predetermined period of time has not elapsed, then the process proceeds to 318. At 318, a determination is made whether a trigger condition occurred (e.g., SNR dropped below a predetermined threshold, interference increased above a predetermined threshold, etc.). If a determination is made, at 318, that (e.g., "yes") a trigger condition occurred, then the process proceeds to 302, where a determination is made whether neighboring nodes are associated with a service provider. If a determination is made, at 318, that (e.g., "no") a trigger condition did not occur, then the process proceeds to 320, where the channel that was previously selected (e.g., at 314) continues to be used and the process proceeds to 316.

Thus, an access point may use a deferential channel selection mode after determining that at least one neighboring access point is associated with a same service provider that is associated with the access point. In the deferential channel selection mode, the access point may perform a scan that excludes operating frequencies of the at least one neighboring access point that is associated with the same service provider as the access point. The access point may select a channel as the operating channel based on the scan and based on one or more characteristics of the channel.

FIG. 4 is a flow diagram of an example process 400 that includes scanning an unlicensed spectrum according to some implementations. The process 400 may be performed by an access point, such as the access point 120, the access point 122, or the access point 124 of FIG. 1.

At 402, a request to select an operating channel for a computing device is received. At 404, a network service provider associated with the computing device is determined. At 406, a determination is made that at least one neighboring access point is associated with the network service provider. At 408, a channel associated with the at least one neighboring access point is determined. The channel may be in an unlicensed spectrum. At 410, a scan of the unlicensed spectrum is performed that excludes the channel associated with the at least one neighboring access point. For example, in FIG. 2, the first access point 120 may receive the request 240 to select an operating channel from the computing device 240. The first access point 120 may determine that the computing device 240 is associated with the first service provider 116 and determine which of the neighboring access points 136 are associated with the first service provider 116. To illustrate, the first access point 120 may determine that the Nth access point 122 is associated with the first service provider 116 and that the N+1 access point 124 is unassociated with the 1st service provider 116. Based on determining that the Nth access point 122 is associated with the first service provider 116, the first access point 120 may select a deferential channel selection mode in which the Nth operating channel 132 of the Nth access point 122 is excluded when the first access point 120 scans the channels 224 to 226 and 228 to 230.

At 412, the operating channel is selected based at least partly on the scan. For example, in FIG. 2, the first access point 120 may select the operating channel 204 based on the deferential scan that excludes the Nth operating channel and based on one or more of the characteristics 206.

At 414, a re-scan of at least a portion of the unlicensed spectrum may be performed if one or more conditions are satisfied. At 416, a new operating channel is selected based at least partly on the re-scan. For example, in FIG. 2, if a predetermined period of time has elapsed after selecting the operating channel 204 or if one (or more) of the characteristics 206 satisfy a threshold, the first access point 120 may re-scan the spectrum 202 and select a new operating channel. In some cases, if a predetermined period of time has elapsed after selecting the operating channel 204 or if one (or more) of the characteristics 206 satisfy a threshold, the first access point 120 may identify the channels (e.g., operating channels) of the neighboring access points 136 that are associated with the first service provider 116, and perform a re-scan of the spectrum 202 that excludes the identified channels. The first access point 120 may determine one or more of the characteristics 206 during the re-scan and select the operating channel 204 based on the re-scan.

Thus, an access point may receive a request from a computing device to identify an operating channel for the computing device. The access point may identify operating channels of neighboring access points that are associated with a same service provider of the computing device. The access point may exclude the identified operating channels when performing a scan to identify the operating channel for the computing device. The access point may perform a re-scan and select a new operating channel if one or more conditions are satisfied. The conditions may include a predetermined period of time elapsing, a signal to noise ratio of the operating channel falling below a first predetermined threshold, an amount of interference in the operating channel exceeding a second predetermined threshold, or the like.

FIG. 5 is a flow diagram of an example process 500 that includes scanning a licensed spectrum and an unlicensed spectrum according to some implementations. The process 500 may be performed by an access point, such as the access point 120, the access point 122, or the access point 124 of FIG. 1.

At 502, a request to select an operating channel for a computing device is received. At 504, a network service provider associated with the computing device (or the access node) is determined. At 506, a determination is made that neighboring access points are unassociated with the network service provider. At 508, a scan of at least a portion of unlicensed spectrum, licensed spectrum, or both is performed. At 510, an operating channel is selected based at least partly on the scan. For example, in FIG. 2, the N+1 access point 124 may receive the request 240 to select an operating channel from the computing device 240. The N+1 access point 124 may determine that none of the neighboring access points 136 are associated with the Mth service provider 118. The N+1 access point 124 may select a normal channel selection mode in which the channels 224 to 226 and 228 to 230 of the spectrum 202 are scanned and the operating channel 204 selected based on the scan.

At 512, when one or more conditions are satisfied, a scan of at least a portion of the unlicensed spectrum, the licensed spectrum, or both may be performed. At 514, a new operating channel may be selected based at least partly on the re-scan. For example, in FIG. 2, if a predetermined period of time has elapsed after selecting the operating channel 204 or if one (or more) of the characteristics 206 satisfy a threshold, the N+1 access point 124 may re-scan the spectrum 202 and select a new operating channel. In some cases, if a predetermined period of time has elapsed after selecting the operating channel 204 or if one (or more) of the characteristics 206 satisfy a threshold, the N+1 access point 124 may determine if any of the channels (e.g., operating channels) of the neighboring access points 136 are associated with the Mth service provider 118, and perform a re-scan of the spectrum 202. If one or more of the neighboring access points 136 are associated with the Mth service provider 118, the N+1 access point 124 may exclude channels (e.g., operating channels) of neighboring access points 136 associated with the Mth service provider 118 when performing the re-scan. If none of the neighboring access points 136 are associated with the Mth service provider 118, the N+1 access point 124 may re-scan the channels in the spectrum 202. The N+1 access point 124 may determine one or more of the characteristics 206 during the re-scan and select the operating channel 204 based on the re-scan and based on the one or more characteristics 206.

Thus, an access point may receive a request from a computing device to identify an operating channel for the computing device. The access point may determine that channels (e.g., operating channels) of neighboring access points are unassociated with a service provider of the computing device (or the access point) and perform a scan of available channels in a spectrum to identify the operating channel for the computing device. The access point may perform a re-scan and select a new operating channel if one or more conditions are satisfied. The conditions may include a predetermined period of time elapsing, a signal to noise ratio of the operating channel falling below a first predetermined threshold, an amount of interference in the operating channel exceeding a second predetermined threshold, or the like.

Example Computing Device and Environment

Figure 6:
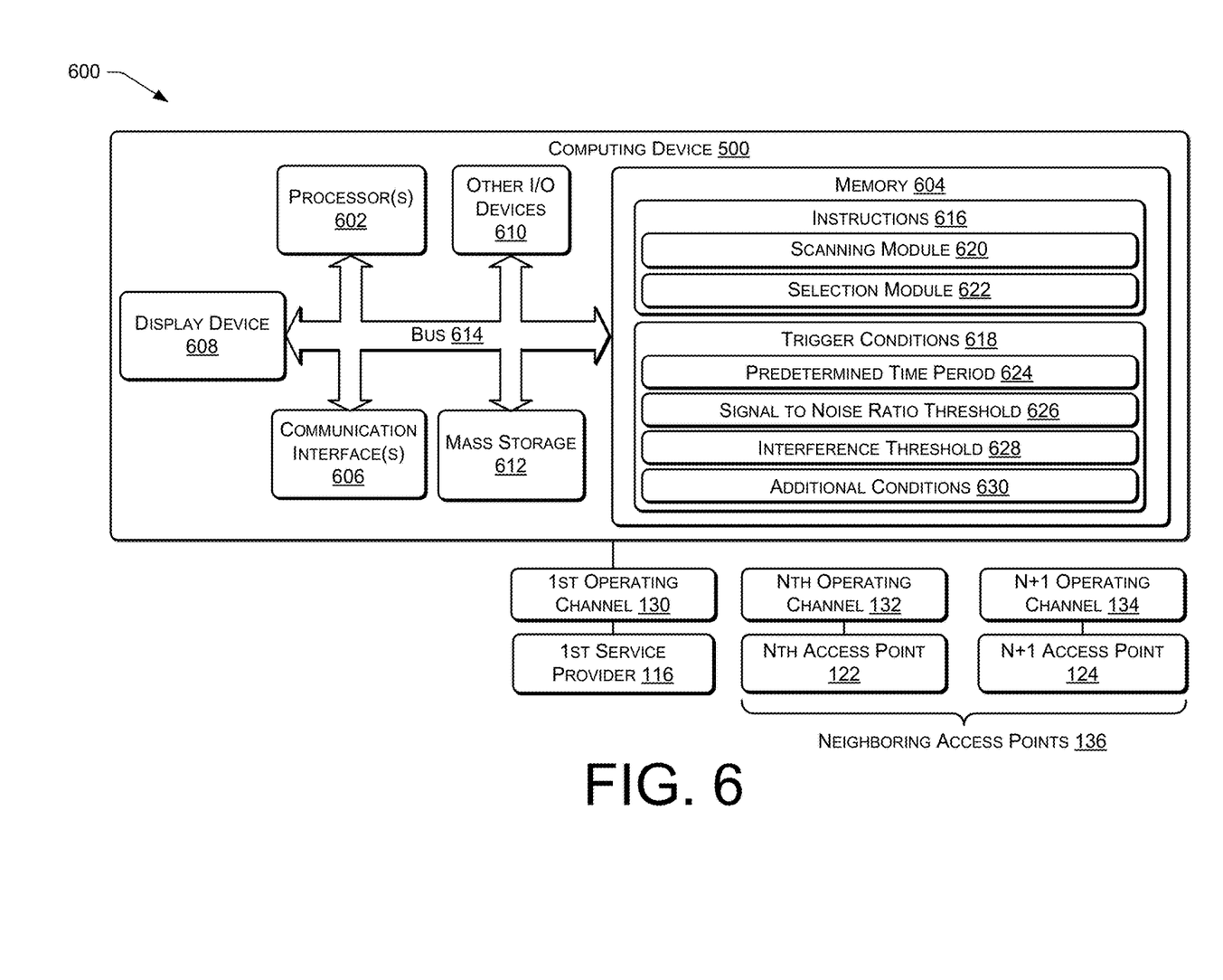
FIG. 6 is a block diagram of an example computing device and environment according to some implementations.

FIG. 6 illustrates an example configuration of a computing device 600 and environment that can be used to implement the modules and functions described herein. For example, the computing device 600 may be used to implement at least a portion of an access point, such as one or more of the access points 120, 122, or 124 of FIG. 1. The computing device 600 may include at least one processor 602, a memory 604, communication interfaces 606, a display device 608, other input/output (I/O) devices 610, and one or more mass storage devices 612, able to communicate with each other, such as via a system bus 614 or other suitable connection.

The processor 602 may be a single processing unit or a number of processing units, all of which may include single or multiple computing units or multiple cores. The processor 602 can be implemented as one or more microprocessors, microcomputers, microcontrollers, digital signal processors, central processing units, state machines, logic circuitries, and/or any devices that manipulate signals based on operational instructions. Among other capabilities, the processor 602 can be configured to fetch and execute computer-readable instructions stored in the memory 604, mass storage devices 612, or other computer-readable media.

Memory 604 and mass storage devices 612 are examples of non-transitory computer storage media for storing instructions which are executed by the processor 602 to perform the various functions described above. For example, memory 604 may generally include both volatile memory and non-volatile memory (e.g., RAM, ROM, or the like). Further, mass storage devices 612 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 612 may be collectively referred to as memory or computer storage media herein, and may be a non-transitory media capable of storing computer-readable, processor-executable program instructions as computer program code that can be executed by the processor 602 as a particular machine configured for carrying out the operations and functions described in the implementations herein.

The computing device 600 may also include one or more communication interfaces 606 for exchanging data with other devices, such as via a network, direct connection, or the like, as discussed above. The communication interfaces 606 can facilitate communications within a wide variety of networks and protocol types, including wired networks (e.g., LAN, cable, etc.) and wireless networks (e.g., WLAN, cellular, satellite, etc.), the Internet and the like. Communication interfaces 606 can also provide communication with external storage (not shown), such as in a storage array, network attached storage, storage area network, or the like.

A display device 608, such as a monitor may be included in some implementations for displaying information and images to users. Other I/O devices 610 may be devices that receive various inputs from a user and provide various outputs to the user, and may include a keyboard, a remote controller, a mouse, a printer, audio input/output devices, and so forth.

Memory 604 may include modules and components for selecting an operating channel according to the implementations herein. In the illustrated example, memory 604 includes instructions 616 and trigger conditions 618. The instructions 616 may be executed by the one or more processors 602 to perform the various techniques described herein. For example, a scanning module 620 may perform a scan of channels in one or more bands in a spectrum and may determine one or more characteristics of each channel. The scanning module 620 may perform the scan in a deferential channel selection mode (e.g., by excluding operating channels of neighboring access points that are associated with a particular service provider) or in a normal channel selection mode. The scanning module 620 may select a channel from among the channels that are scanned based on one or more characteristics. Of course, the instructions 616 may include other types of software, such as an operating system, device drivers, and other modules to perform other types of functions.

The trigger conditions 618 may include conditions that when satisfied, cause an access point (e.g., one of the access points 120, 122, or 124) to re-scan the spectrum to select a new operating channel. For example, the spectrum may be re-scanned and a new operating channel selected after a predetermined time period 624 has elapsed. The spectrum may be re-scanned and a new operating channel selected when a signal to noise ratio of the operating channel satisfies (e.g., falls below) a signal to noise ratio threshold 626. The spectrum may be re-scanned and a new operating channel selected when an amount of interference in the operating channel satisfies (e.g., is greater than) an interference threshold 628. The spectrum may be re-scanned and a new operating channel selected when one or more additional conditions 630 are satisfied.

The various techniques described above are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, by an access point, a request to select an operating channel for a computing device;
   determining, by the access point, a network service provider associated with the access point;
   determining, by the access point, that a first neighboring access point of a plurality of neighboring access points is associated with the network service provider;
   determining, by the access point, a first channel of the first neighboring access point, wherein the first channel is in an unlicensed spectrum;

determining, by the access point, that a second neighboring access point of the plurality of neighboring access points is not associated with the network service provider;

determining, by the access point, a second channel of the second neighboring access point, wherein the second channel is in an unlicensed spectrum;

performing, by the access point, a scan of a plurality of available channels in the unlicensed spectrum, wherein the plurality of available channels does not include the first channel and includes the second channel in response to determining that the first neighboring access point is associated with the network service provider and that the second neighboring access point is not associated with the network service provider; and selecting, by the access point, the operating channel based at least partly on the scan of the plurality of available channels in the unlicensed spectrum.

2. The method of claim 1, wherein selecting the operating channel further comprises:

selecting the operating channel from the plurality of available channels in the unlicensed spectrum based at least partly on a signal to noise ratio of the operating channel.

3. The method of claim 1, wherein the unlicensed spectrum comprises at least one of:

5.15 GigaHertz (GHz) to 5.25 GHz; or 5.725 GHz to 5.825 GHz.

4. The method of claim 1, further comprising:

after a predetermined period of time, performing, an additional scan of the plurality of available channels in the unlicensed spectrum, wherein the additional scan excludes the first channel; and selecting a new operating channel based at least partly on the additional scan of the plurality of available channels in the unlicensed spectrum.

5. The method of claim 1, further comprising:

determining that a characteristic associated with the operating channel has fallen below a predetermined threshold; and selecting a different operating channel.

6. The method of claim 5, wherein selecting the different operating channel comprises:

performing a second scan of at least the unlicensed spectrum;

determining that at least one additional access point of the one or more neighboring access points is associated with the network service provider;

determining an additional channel of the at least one additional access point, wherein the additional channel is in the unlicensed spectrum;

performing an additional scan of at least the plurality of available channels in the unlicensed spectrum, wherein the additional scan excludes the additional channel of the of the at least one additional access point; and selecting the different operating channel based at least partly on the additional scan.

7. One or more non-transitory computer readable media storing instructions that are executable by one or more processors to perform operations comprising:

receiving a request to select an operating channel for a computing device that is associated with a network service provider;

determining that a first neighboring access point is associated with the network service provider;

determining a first channel in an unlicensed spectrum of the first neighboring access point;

determining that a second neighboring access point is not associated with the network service provider;

determining a second channel in an unlicensed spectrum of the second neighboring access point; and selecting the operating channel based at least partly on a scan of a plurality of available channels in the unlicensed spectrum, wherein the plurality of available channels does not include the first channel and includes the second channel in response to determining that the first neighboring access point is associated with the network service provider and that the second neighboring access point is not associated with the network service provider.

8. The one or more non-transitory computer readable media of claim 7, wherein the operations further comprise:

selecting the operating channel from the plurality of available channels in the unlicensed spectrum based at least partly on a clarity of the operating channel.

9. The one or more non-transitory computer readable media of claim 7, wherein the operations further comprise:

selecting a different operating channel after a predetermined period of time based at least partly on an additional scan of the plurality of available channels in the unlicensed spectrum, the additional scan excluding the first channel.

10. The one or more non-transitory computer readable media of claim 7, wherein the operations further comprise:

selecting a different operating channel based at least in part on determining that a signal to noise ratio associated with the operating channel satisfies a predetermined threshold.

11. The one or more non-transitory computer readable media of claim 7, wherein the operations further comprise:

selecting a different operating channel based at least in part on determining that an amount of interference associated with the operating channel satisfies a predetermined threshold.

12. An access point, comprising:

one or more processors; and one or more computer readable media to store instructions that are executable by the one or more processors to perform operations comprising:

receiving a request to select an operating channel for a computing device;

determining first one or more channels in an unlicensed spectrum in which first one or more neighboring access points associated with a particular network service provider are broadcasting, the particular network service provider associated with the access point;

determining second one or more channels in an unlicensed spectrum in which second one or more neighboring access points not associated with the particular network service provider are broadcasting;

performing a scan of a plurality of available channels in the unlicensed spectrum, wherein the plurality of available channels does not include the first one or more channels and includes the second one or more channels in response to the first one or more neighboring access points being associated with the particular network service provider and the second one or more neighboring access points not being associated with the particular network service provider; and selecting the operating channel based at least partly on the scan of the plurality of available channels in the unlicensed spectrum.

13. The access point of claim 12, wherein the operations further comprise:
  determining a signal to noise ratio of at least one channel in the plurality of available channels in the unlicensed spectrum; and
  selecting the operating channel based at least partly on the signal to noise ratio.

14. The access point of claim 12, wherein the operations further comprise:
  after a predetermined period of time, selecting a new operating channel.

15. The access point of claim 12, wherein the operations further comprise:
  determining that a characteristic associated with the operating channel satisfies a predetermined threshold; and
  selecting a new operating channel for the computing device to use instead of the operating channel.

16. The access point of claim 15, wherein the characteristic comprises at least one of:
  a signal to noise ratio associated with the operating channel; or
  an amount of interference associated with the operating channel.

17. The access point of claim 15, wherein selecting the new operating channel comprises:
  performing a second scan of the plurality of available channels in the unlicensed spectrum, wherein the second scan excludes the first one or more channels;
  performing a third scan of additional available channels in a licensed spectrum; and
  selecting the new operating channel based at least partly on the second scan and the third scan.

18. The access point of claim 12, wherein the unlicensed spectrum includes at least a portion of spectrum between 5.15 GigaHertz (GHz) and 5.825 GHz.

19. The method of claim 1, wherein selecting the operating channel further comprises selecting the operating channel based at least partly on a data transfer rate of the operating channel.

20. The method of claim 1, wherein selecting the operating channel further comprises selecting the operating channel from the plurality of available channels that does not include the first channel and is based on a characteristic of the operating channel.

* * * * *